Patented May 26, 1931

1,806,734

UNITED STATES PATENT OFFICE

HARRY T. BENNETT, LE ROY G. STORY, AND HOWARD B. BECKLEY, OF TULSA, OKLAHOMA; SAID STORY ASSIGNOR TO JOSIAH CHATFIELD, OF CLEVELAND, OHIO

LUBRICATING OIL

No Drawing. Application filed March 29, 1926. Serial No. 98,380.

This invention relates to lubricating oils. An object is to produce an oil for lubricating purposes possessing the following properties, namely, flowing tendencies at very low temperatures, adhesion to moving parts and high penetration.

Our composition preferably consists of a mixture of mineral oil, an animal or vegetable oil and a soap, such as aluminum stearate. In some cases, however, it is unnecssary to add the animal or vegetable oil, as the value of this ingredient depends upon the use for which the product is prepared.

The invention herein claimed includes the use of an animal oil, but the use of a small quantity of soap, preferably aluminum stearate, to lower the pour point of an oil, as herein disclosed, is more broadly claimed in a patent application filed by Harry T. Bennett and Le Roy G. Story on October 24, 1927, Serial Number 228,487.

In compounding lubricating oil, a small percentage of an animal oil, such as neat's-foot oil, has been added to prevent so-called chattering of brakes, which results from hardening of the composition used in the brake bands. Most of these oils become solid at about 20° F. and lose their ability to flow. Insofar as we are aware, this is true of all these earlier lubricating oils made from paraffin base crudes.

The preferred form of our composition not only flows readily at zero Fahrenheit but also adheres in a very desirable manner to the surfaces with which it comes in contact and penetrates these surfaces, keeping them smooth, soft, and free from uneven wear or other troubles resulting from poor lubrication.

The importance of low pour point oils cannot be overemphasized as the starting of motors at low temperatures is very difficult with an oil that has solidified. Heretofore the lubricating oils placed on the market possessing the property of flowing at zero degrees Fahrenheit have been from asphaltic base crudes. We have shown how this result can be accomplished in a lubricating oil derived from a paraffin base crude, by combining it with a soap as herein described.

In preparing the composition we prefer to use the ingredients in about the following proportions, viz: 95.9 percent by weight of a mineral oil of about tweney-six gravity Baumé and 280 Saybolt viscosity at 100° F.; 4 percent by weight of neat's-foot oil and 0.1 percent by weight of aluminum stearate. When the composition is prepared in this manner, with the required very low percentages of soap, the pour point is greatly reduced without substantially affecting the viscosity of the oil. It is to be understood, however, that the composition is not limited to the above named ingredients or proportions. Any suitable mineral oil within the class of lubricants may be used, any vegetable or animal oil may be employed or completely eliminated depending on circumstances, and by soap is meant the group of salts resulting from saponification of an animal or vegetable oil or fatty acid by an inorganic base.

Good results may be obtained when the ingredients are varied within the following limits: mineral oil 89 to 99.95 percent; animal or vegetable oil 2 to 10 percent; soap 0.05 to 1.0 percent.

The ingredients are preferably mixed by first preparing by aid of heat a jelly consisting of 10 percent by weight of soap and 90 percent by weight of mineral lubricating oil. This is then commingled in the desired proportion with a solution of the mineral oil and the animal or vegetable oil. The product may, however, be prepared by mixing the ingredients in any manner until solution is obtained.

We claim:

1. A lubricating oil having a pour point less than 20° F. comprising about 95.9 percent 280 Saybolt viscosity at 100° F. mineral lubricating oil; about 4 percent neat's-foot oil, and about .1 percent aluminum stearate.

2. A lubricating composition comprising a mineral lubricating oil having a relatively high pour point and containing an animal oil combined with aluminum stearate whereby the pour point of the oil is reduced to less than 20° F., the weight of the aluminum stearate being less than .3 percent of the weight of the mass.

3. A lubricating composition comprising a mineral lubricating oil having a relatively high pour point and containing an animal oil combined with aluminum stearate whereby the pour point of the oil is reduced to less than 20° F., the weight of the aluminum stearate, being about 0.1 per cent of the weight of the mass.

4. A lubricating composition comprising a mineral lubricating oil having a relatively high pour point and a viscosity of more than 100 Saybolt at 100° F., containing 2 to 10 percent animal oil, and combined with aluminum stearate whereby the pour point is reduced to about 0° F. without substantially affecting the viscosity of the oil, the weight of the aluminum stearate being about 0.1 percent of the weight of the mass.

In testimony that we claim the foregoing we hereunto affix our signatures.

HARRY T. BENNETT.
LE ROY G. STORY.
HOWARD B. BECKLEY.